May 10, 1955 J. G. DWYER 2,707,879
GAS PRESSURE DIFFERENTIAL GAUGE
Filed July 11, 1950 2 Sheets-Sheet 1
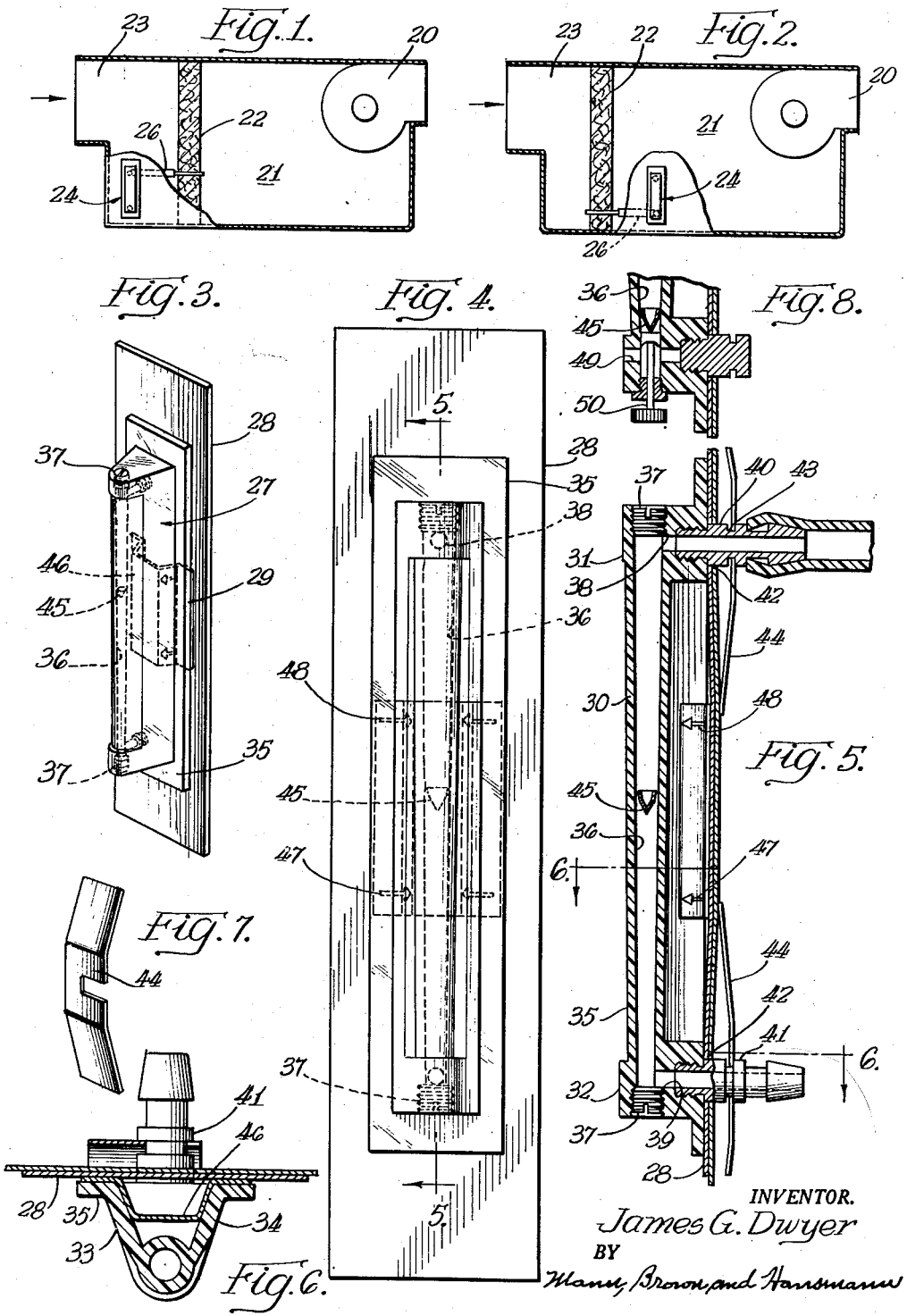
INVENTOR.
James G. Dwyer
BY
Maney, Brown, and Hansmann
attys.

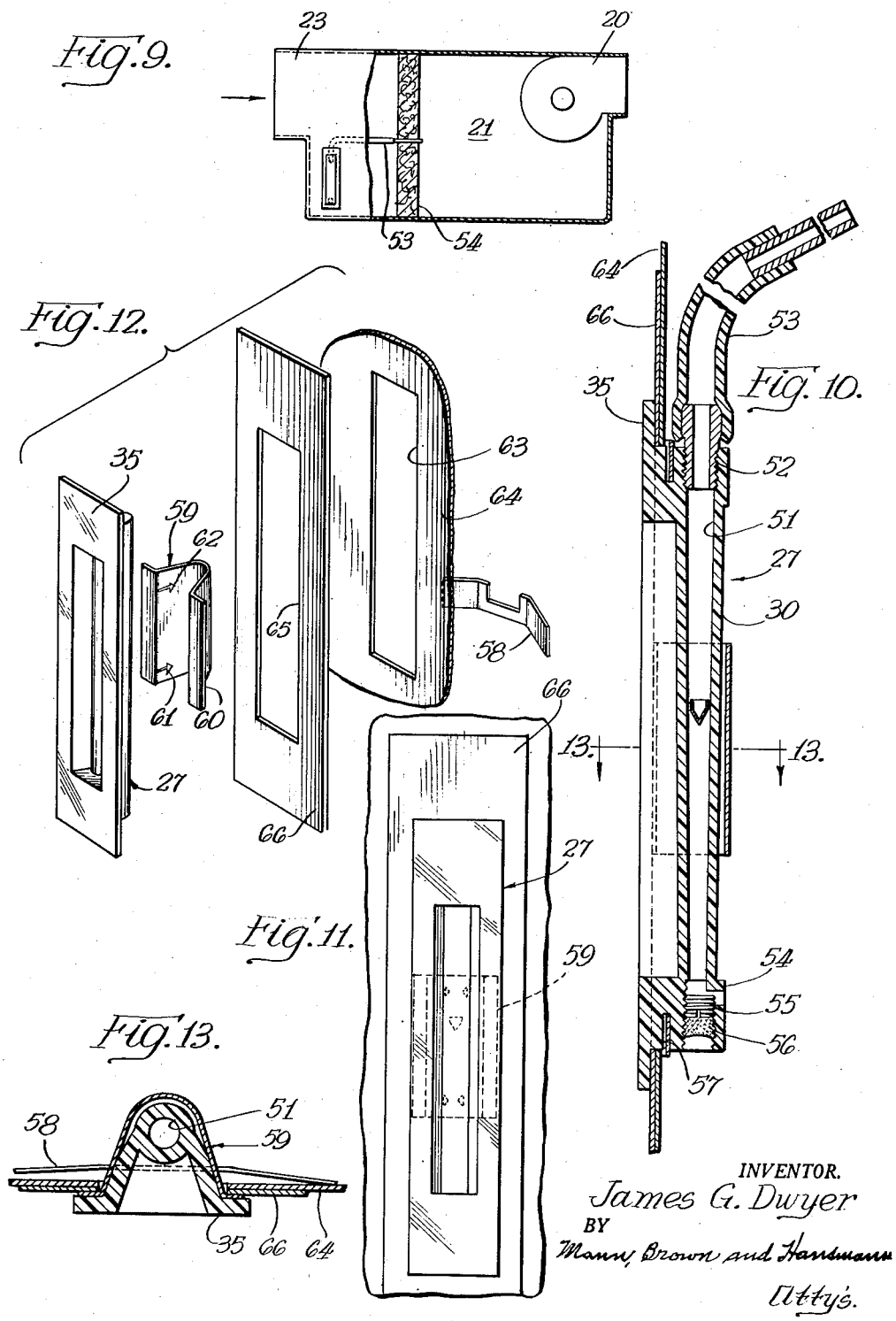

United States Patent Office 2,707,879
Patented May 10, 1955

2,707,879

GAS PRESSURE DIFFERENTIAL GAUGE

James G. Dwyer, Deerfield, Ill., assignor to F. W. Dwyer Mfg. Co., a corporation of Illinois Application July 11, 1950, Serial No. 173,207

8 Claims. (Cl. 73—209)

This invention relates to a device for indicating relatively small variations in the static pressure differential between two plenum chambers or other points in an air or gas distribution system. The invention is particularly applicable to air distribution systems in which it is desirable to visually indicate when an air filter in the system requires replacement or cleaning.

In air conditioning systems, both of the room cooler and permanent installation types, the effectiveness of the air conditioning system is severely impaired after the air filter has become clogged with foreign material to such an extent that it substantially impedes the flow of air through the system. Filter manufacturers commonly recommend that when the filter has trebled its resistance to air passage, it should be cleaned or replaced. In practice, however, it has been difficult or at least inconvenient to ascertain when a filter has trebled its air resistance, and as a result, many air conditioning systems operate far below their rated capacities due to insufficient air circulation.

The present invention provides an extremely simple gas pressure differential gauge (which for convenience will be called a draft gauge) for measuring the static pressure differential between two points in an air distribution system, such points usually being on the opposite side of a filter in order to determine the resistance offered by the air filter to air circulation. The gauge is inexpensive to manufacture, easy to install, and virtually foolproof, and it is the provision of these attributes and special utility for a draft gauge which constitute the principal objects of this invention.

Further and other objects of the invention will become apparent as the disclosure proceeds and the description is read in conjunction with the accompanying drawings in which:

Fig. 1 is a diagrammatic view showing one application of the draft gauge of this invention to an air distribution system;

Fig. 2 shows another application of the invention to an air distribution system;

Fig. 3 is a perspective view showing a preferred embodiment of the invention in which the gauge itself is mounted outside of the duct work constituting the air distribution system;

Fig. 4 is a front elevational view of the form of the invention shown in Fig. 3;

Fig. 5 is a vertical sectional view taken on the line 5—5 of Fig. 4;

Fig. 6 is a horizontal sectional view taken on the line 6—6 of Fig. 5;

Fig. 7 shows one of the retaining clips used for securing the draft gauge unit in place;

Fig. 8 shows a modification of the invention in which the lower end of the float tube is in open communication with the atmosphere and is provided with a valve for intermittently placing the gauge in operation;

Fig. 9 shows the application of a modified form of the invention to an air distribution system;

Fig. 10 is a vertical cross-sectional view of the draft gauge shown in Fig. 9 in which the float tube itself is mounted within the confines of the duct work, but is visible from the exterior;

Fig. 11 is a front elevational view of the form of invention shown in Figs. 9 and 10;

Fig. 12 is an exploded perspective view showing the components of the draft gauge of Figs. 9, 10, and 11; and Fig. 13 is a transverse sectional view on the line 13—13 of Fig. 10.

A simple form of air distribution system is shown in Figs. 1 and 2, the system comprising a blower 20 which draws air into a plenum chamber 21 through a filter 22 which is interposed in the path of the air that is moving into the plenum chamber 21 through an intake opening 23. This basic system corresponds to that used in most permanent installations of air conditioning equipment, and also air conditioning units of the room type.

In order to ascertain when the filter 22 is ready for replacement or cleaning, it is necessary to measure changes in the static pressure between the inlet 23 and the plenum chamber 21. This can be accomplished by mounting the draft gauge unit, generally designated 24, on the intake side of the filter 22 and extending the top connection 26 through the filter into the plenum chamber 21 (see Fig. 1), or the unit may be mounted within the plenum chamber 21, and the lower connection 26 with the draft gauge may be extended through the filter 22 into the intake space 23.

The draft gauge 24, which constitutes the subject matter of this invention, comprises a transparent plastic body member 27 preferably formed by molding, a back plate 28, and a vertically adjustable scale member 29 which is interposed between the body member 27 and back plate 28.

The body member 27 is preferably made of such moldable plastic material as "Lucite" or "Plexiglas," and includes a tapered float tube 30 having integral head portions 31 and 32 which merge with angular side walls 33 and 34 and have a flat base 35. The float tube 30 has an inside straight taper, preferably on the order of one-eighth inch per foot, with the larger diameter being at the top as clearly indicated in Fig. 5. The mold for the body member 27 preferably is formed so that the walls of the float tube 30 are of uniform thickness throughout its length in order to prevent warpage of the tube as it comes from the mold.

The tapered passageway 36 in the float tube 30 is closed at the top and bottom by plugs 37, and communicates with horizontal passages 38 and 39 in the heads 31 and 32 respectively. Steel nipples 40 and 41 are threaded into the passageways 38 and 39 respectively and pass through suitable openings 42 provided in the back plate 28 thereby holding the back plate in proper relationship to the body member 27.

Each of the nipples 40 and 41 has an annular groove 43 adapted to cooperate with a spring clip 44 such as shown in Fig. 7 so that when the unit is mounted on sheet metal duct work or the like, the nipples 40 and 41 extend through suitable openings provided in the duct work, and clips 44 resiliently retain the gauge in place.

An inverted conical float member 45, preferably made of lightweight plastic material, is mounted in the float tube 30, and rises or falls in the float tube according to the flow of gas or air through the passageways 39, 36, and 38, respectively. By varying the weight of the float 45 and/or the taper of the float tube 36, and/or by restricting the passageway through the float tube, it is possible to provide gauges of this type having the desired range of sensitivity to static pressure differentials. In ordinary applications involving air filters, the device should be sensitive to changes of static pressure differential ranging from near zero to an inch of water, and a device made in accordance with my invention can readily be made to have operating characteristics within this range.

In order to facilitate reading of the gauge and calibration for the particular installation to which it is applied, the sliding indicator plate 29 is provided which is clamped in adjusted position between the base portion 25 of the gauge body 27 and the base plate 28. The indicator plate 29 has a bowed portion 46 which is shaped to conform generally with the pocket between the side walls 33 and 34.

The indicator plate may be provided with any suitable scale, but ordinarily it will suffice if green arrows, for example, are marked on the plate adjacent to the bottom thereof as indicated at 47, and red arrows 48 are marked on the plate adjacent to the top thereof. When the unit is installed either on the high pressure side or the low pressure side of the filter as shown in Figs. 1 and 2, respectively, the indicator plate 29 is moved vertically until it is opposite the float 45 in the position that it occupies for a new filter 22, and the arrow 48 is a sufficient distance above the green arrow 47 so that as the filter 22 builds up resistance, the float 45 will gradually rise to the level of the arrow 48 when the filter has substantially trebled its initial air resistance.

It will be seen from this arrangement that it is a very simple matter to calibrate the instrument to the particular application of the draft gauge inasmuch as the plate 29 may be readily shifted along the float tube by merely inserting a screw driver or other flat device between the back plate 28 and the gauge member 27 to free the indicator plate 29 for movement in a vertical direction, and upon removing the prying device from between the back plate 28 and gauge member 27, the indicator plate 29 is firmly held in adjusted position by friction between the base 35 and back plate 28 with the resilient clips 44 continuously urging these members into firm engagement.

In some installations where it is impossible or inconvenient to place the draft gauge on the high pressure side of the filter as shown in Fig. 1, and to avoid the necessity of forcing the tube 26 through the filter 22 as shown in Fig. 2, the differential static pressure may be taken between the low pressure side of the filter and the atmosphere. In such a case, the lower passageway 39 is plugged as shown in Fig. 8, and another passageway 49 is formed in the lower head 32 which places the lower end of the float tube passageway 36 in communication with the atmosphere. In order to protect the interior of the float tube passageway 36 from accumulations of dust and other foreign material which might interfere with the proper operation of the float 45, a poppet valve 50 may be provided which in its raised position cuts off communication of the passageway with the atmosphere, but which may be lowered to a position below the passageway 49 whenever it is desired to take a reading.

If it is desired to have a flush mounting of the draft gauge with respect to the duct wall, the arrangement in Figs. 9 to 13 may be employed. In this arrangement, the gauge body 27 is formed in the same manner as previously described with the exception that lateral passages 38 and 39 are omitted, and instead, the top of the tapered float tube passageway 51 is provided with a nipple 52 for mounting a hose 53 that is carried through the filter 54 to the low pressure side of the filter. The lower end of the filter tube passageway 51 communicates with a lateral opening 54 which opens into the intake duct for the filter 54 and the size of which may be controlled or regulated by the set screw 55 which is threaded into the lower end of the gauge body 27. Preferably this calibration is made at the factory and the set screw is sealed into suitable position by cement 56.

Slots 57 cut into the ends of the gauge member body 27 receive spring clips 58 for holding the gauge in place within the duct work, and in this case, the indicator plate, generally designated 59, is of somewhat larger size so that it fits over the exterior of the float tube 30. The laterally extending flanges 60 of the indicator plate lie between the base 35 of the gauge body 27 and the base plate 28 so that again the indicator plate is frictionally held in adjusted position by the tension of the spring clips which secure the entire unit in place.

The gauge body 27 being transparent, the green arrow indicia 61 and the red arrow indicia may be readily seen through the walls of the gauge body.

Since in this embodiment of the invention the body of the gauge projects into the duct interior, it is necessary to cut a slot 63 in the duct work 64, and a similar slot 65 in the back plate 66 to receive the gauge, whereas in the form of the invention shown in Figs. 1 to 8, inclusive, it is only necessary to drill holes to receive the nipples 40 and 41.

Obviously, if it is desired to employ the form of the invention shown in Figs. 9 to 12, inclusive, on the low pressure side of the filter, the nipple 52 would be applied to the lower end of the gauge body and the upper end of the tube would be in open communication with the interior of the duct work through a passageway and adjustable set screw arrangement such as shown at the lower end of the float tube 30 in Fig. 10.

The draft gauge of this invention is in a sense a variable orifice flow meter because, as the float rises within the tapered float tube, there is more space for the passage of air around the tube, and since the taper is a straight taper, the action of the float in rising and falling within the tube according to static pressure differentials follows substantially the logarithmic scale.

Although the invention has been described in its particular application to its use in connection with air filters, it should be understood that there are many other uses for the gauge wherein static pressure differentials are to be indicated.

I claim:

1. In a gauge for measuring the static pressure differential between two points in a gas distribution system, the combination of a vertically positioned, transparent float tube having a tapered bore diverging upwardly, a float within the tube, means for connecting the upper and lower ends of the float tube to said two points with the upper end connected to the point of lower static pressure, and means for mounting the gauge on a wall with a portion of the gauge projecting through the wall, said last named means comprising a hose nipple secured to said tube and at right angles thereto and provided with an annular groove in said projecting portion, and a resilient clip having a notched-out portion engageable with said groove.

2. For use in a gauge of the type in which a float is mounted in a tapered vertical tube through which a fluid is circulated, the improved construction of the gauge body which comprises a body member of transparent moldable plastic material having a front cylindrical portion provided with a tapered axial bore diverging upwardly, integral rearwardly extending side spaced walls providing a channel space therebetween, and oppositely extending coplanar marginal flanges integral with said side walls and forming a flat base for convenient mounting of the gauge body on a flat support.

3. The combination with a gauge body as set forth in claim 2 of an indicia plate complementary in shape to that of said channel space and mounted therein, in which location it is visible through said transparent body member.

4. A gauge body as set forth in claim 2 in which the ends of the channel space are closed by integral bosses of said material.

5. The combination gauge body as set forth in claim 4 of an indicia plate complementary in shape to that of said channel space and mounted therein, in which location it is visible through said transparent body member, said indicia plate being adjustable lengthwise within said channel space.

6. The combination as set forth in claim 5 in which said indicator plate is provided with marginal flanges which lie against and extend beyond the extremities of the marginal flanges of the gauge body.

7. A gauge body as set forth in claim 2 in which said side walls diverge rearwardly.

8. The combination as set forth in claim 4 in which the bosses are provided with passages at right angles to and communicating with said axial bore and hose nipples mounted in said lateral passages, said hose nipples having an annular shoulder for cooperation with a mounting clip.

References Cited in the file of this patent

UNITED STATES PATENTS

| Number | Name | Date |
|---|---|---|
| 628,478 | Kuehne | July 11, 1899 |
| 1,215,129 | Edlich | Feb. 6, 1917 |
| 1,917,637 | Dwyer | July 11, 1933 |
| 2,254,259 | Aller | Sept. 2, 1941 |
| 2,258,023 | McKernon | Oct. 7, 1941 |
| 2,333,884 | Porter | Nov. 9, 1943 |
| 2,345,935 | Hassler | Apr. 4, 1944 |
| 2,361,440 | Williamson | Oct. 31, 1944 |
| 2,503,091 | Brooke, Jr. et al. | Apr. 4, 1950 |

OTHER REFERENCES

Rotameters, Schutte & Koerting Co., Philadelphia, Pa., Bulletin No. 18R, p. 18022.